United States Patent Office 2,734,396
Patented Feb. 14, 1956

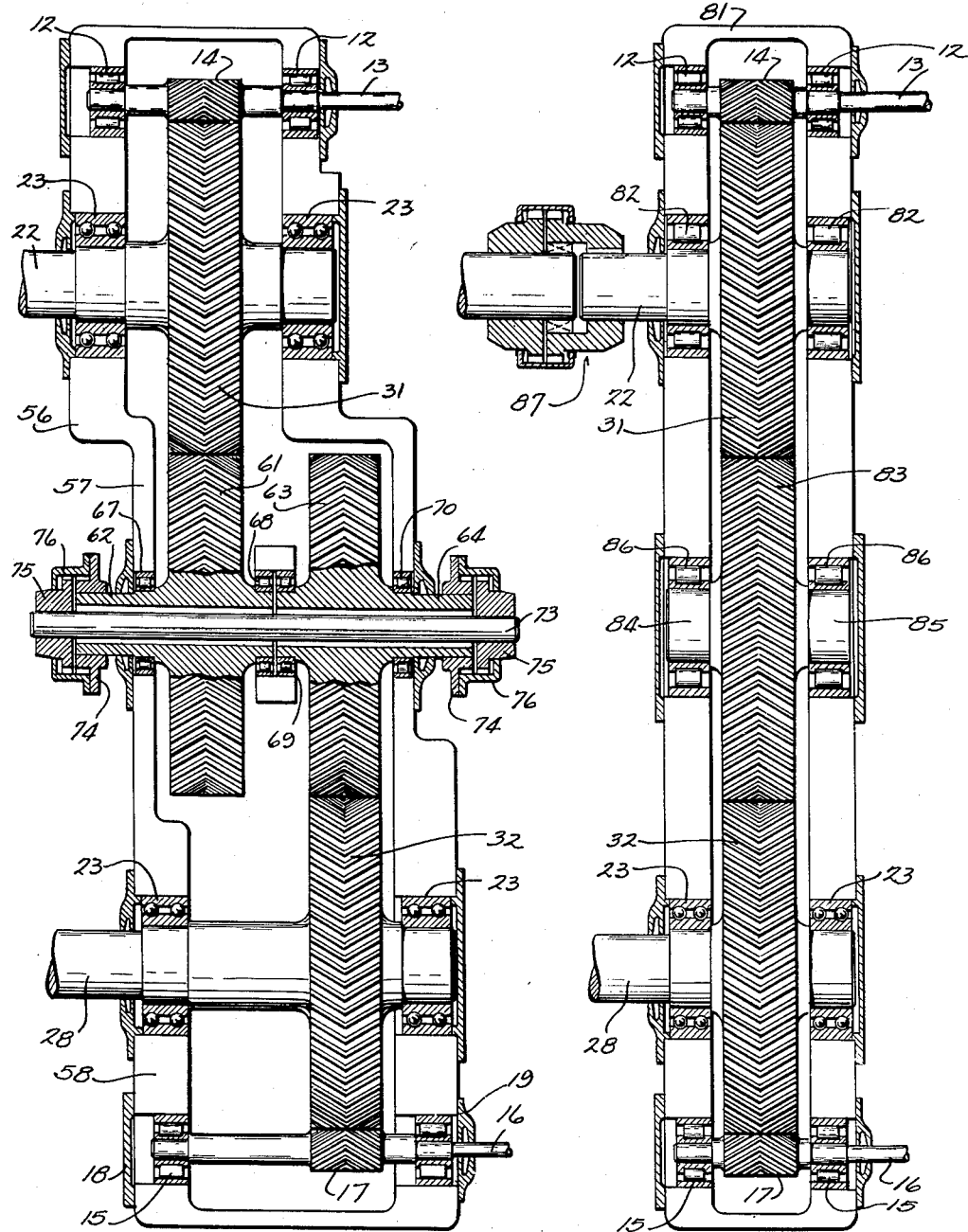

2,734,396

TWIN DRIVE AND DRIVEN POWER TRANSMISSIONS

Louis W. Falk and Walter P. Schmitter, Milwaukee, Wis., assignors to The Falk Corporation, Milwaukee, Wis., a corporation of Wisconsin Application June 10, 1950, Serial No. 167,414

4 Claims. (Cl. 74—665)

This invention relates to power transmitting mechanisms, and more particularly to a power transmission having multiple driving and driven shafts and gearing interconnecting all the driving shafts in power transmitting relation with all the driven shafts.

In some multiple driven shaft installations, such as hoists comprising two cable drums, it is desirable to use a power transmitting mechanism receiving the combined driving power of two driving means such as electric motors, for winding up the cable on the one drum and thereby raising a load while simultaneously playing out the cable from the other drum, or upon reversal of the rotation of the motors, to wind up the cable on the said other drum while the cable is played out from the said one drum.

It is an object of the invention to provide a power transmitting mechanism in which two power input elements are so connected with two power output elements in such a manner that power applied to both the input elements from independent power means will be combined to drive both output elements, and so that the combined driving power of both means may be taken off at either of the output elements while the other is idling.

Another object of the invention is to provide a twin power transmitting mechanism of the type incorporating double helical driving pinions and double helical driven gears for connecting a pair of power input shafts with a pair of power output shafts, respectively, and intermediate double helically toothed power transmitting elements or element for connecting the double helical driven gears in power transmitting relation, to provide for uniform loading over both helices of all gearing.

A further object of the invention is to provide a twin power transmitting mechanism for use with two driving means of equal or unequal capacity, and in which the gearing is so proportioned and arranged that the driving means will equally share the total load on one or the other of the output elements.

A further object of the invention is to compensate for axial play between all intermeshing double helical gears of a twin driven and twin driving transmission to insure proper cooperation of the gears, and to avoid disturbing reactions between the gears due to bending deflection of either of the driven or output shafts.

And a further object is to prevent axial and apex runout of the helix from introducing disturbances on idler gear or gears and other gears in the system.

Objects and advantages other than those above set forth will be apparent from the following description when read in connection with the accompanying drawing in which:

Fig. 1 is a sectional view of a twin power transmission having parallel input and output shafts, the view being taken substantially on a horizontal central plane through the unit; and Fig. 2 is a view similar to Fig. 1 but showing a modified form of the transmission.

Referring to the drawings by reference numerals, an enclosing and supporting casing has mounted therein a first pair of axially aligned roller bearings 12 for mounting a first input shaft 13 in axially shiftable relation in the casing. A first double helical driving pinion 14 is secured to the input shaft 13 between the roller bearings 12 for rotation and axial shifting movement with the shaft 13. A second pair of axially aligned roller bearings 15 are mounted in the casing and rotatably support a second power input shaft 16 which has a second double helical driving pinion 17 secured thereto between the bearings 15 for rotation and axial shifting movement with the second power input shaft 16. The bearing cavities in the casing are closed by end plates 18, and by apertured plates 19 for extension of the input shafts therethrough in suitable sealed relation.

A first power output shaft 22 is rotatably mounted in the casing in axially non-shiftable relation thereto by two double row ball bearings 23. The outer raceways of the ball bearings 23 bear axially and severally against retainer and sealing caps secured to the casing and the inner raceways of the ball bearings 23 bear axially and severally against a shoulder on the shaft 22 within the casing.

A second power output shaft 28 is rotatably mounted adjacent the other end of, and on the side walls of the casing by two double row ball bearings in axially fixed relation to the casing, the mounting of the output shaft 28 corresponding to the mounting of the output shaft 22, and the double row ball bearings, caps and shoulders for retaining the shaft 28 in axially fixed position being similar to the ball bearings, caps and shoulders which retain the output shaft 22 in axially fixed position.

The power input shafts 13 and 16 extend from the casing and may be connected by any suitable means to two independent sources of power such as electric motors, not shown. The power output shafts 22 and 28 extend from the casing 5 and may be suitably connected to driven machinery, as for instance, to the cable drums of a hoist, not shown. The two power input shafts 13 and 16 are operatively inter-connected with the two power output shafts 22 and 28 by double helical gearing in such a manner that power applied to the input shafts from independent power means will be combined to drive both output shafts 22 and 28, and so that the combined power of both input means may be taken off at either of the output shafts 22 or 28 while the other is idling.

In Fig. 1, the casing provides three sections 56, 57 and 58 laterally offset relative one another. The double helical power input pinion 14 in the casing section 56 is connected with a double helical gear 31 on power output shaft 22 and the double helical input pinion 17 in the casing section 58 is connected with a double helical gear 32 on the power output shaft 28. The input elements are rotatably mounted in and in axially shiftable relation to the casing and the output elements are rotatably mounted in but axially non-shiftable relative to the casing.

The intermediate power transmitting element of the present transmission comprises a pair of double helical intermediate gears 61 and 63 with integral hollow shafts 62 and 64, respectively, which are rotatably mounted in the casing section 57 in coaxial relation with and for torque transmitting to each other. Intermediate gear 61 meshes with driven gear 31 and the other intermediate gear 63 meshes with the other driven gear 32. The intermediate gears are rotatably mounted in axially shiftable relation to the casing. The gear 61 is mounted on roller bearings 67 in one casing side wall and in roller bearings 68 in a bracket centrally in the casing while the gear 63 is similarly mounted in bearing 69, 70. The central bracket bearings 68, 69 are spaced from each other so that the gears 61, 63 may severally shift axially in either direction.

A torsionally flexible element in the form of a relatively long bar 73 of circular cross-section extends through the axial passages through the gear shafts 62, 64 and is connected at its opposite ends in torque transmitting and flexible relation with the intermediate gears by flexible couplings. The flexible couplings are identical and comprise an externally toothed member 74 which is non-rotatably secured to the gear shaft 62, another externally toothed member 75 which is non-rotatably secured to the torsion bar 73, a resilient grid (not shown) in co-operative engagement with the external teeth of the members 74 and 75, and a cover 76 fixed on one coupling member and extending over the other coupling member.

The structure of the flexible couplings is disclosed in Patent 1,915,399, issued to James Bibby on June 27, 1933, and need not be further described, except to say that coupling part 75 bears on cover 76 to limit relative movement between parts 74 and 75, or form a so-called "piloted" coupling which does not permit radial displacement. The inherent characteristics of this coupling permit the free axial movement of the idler gears 61 and 63 without restraint within the desired limits of such movement.

It will be noted that the construction and mounting of the intermediate power transmitting element is such as to permit axial movement of the intermediate gears 61 and 63 independently of each other and also to permit slight torsional displacement of such gears relative to each other to insure proper load transfer between the double helical gears 31 and 61 and between the double helical gears 63 and 32.

In the modified form of transmission shown in Fig. 2, the power input elements comprise input shafts 13 and 16 and double helical driving pinions 14 and 17, respectively, mounted in the casing by roller bearings 12 for the shaft 13 and by roller bearings 15 for the shaft 16, the bearings permitting axial movement of the shafts. The two power output elements in Fig. 2 correspond generally to the two power output elements of the transmissions shown in Fig. 1 and are designated by the same reference characters as therein. However, output element 22, 31 is now supported in a pair of roller bearings 82 by means of which such power output element is rotatably mounted in and axially shiftable relative to the casing. The second output element in Fig. 2 comprising the output shaft 28 and the driven gear 32 is mounted in the casing in axially fixed relation thereto by the double row ball bearings 23.

The intermediate power transmitting element of the transmission shown in Fig. 2 comprises a double helical gear 83 with trunnions 84 and 85 integrally formed therewith. The trunnions 84 and 85 are rotatably supported by roller bearings 86 which permit axial movement of the gear relative to the casing to insure proper centering and load transfer between the gears 31 and 83, and gears 32 and 83. In the transmission shown in Fig. 2, a flexible coupling 87 is preferably employed to connect the output shaft 32 with the load, the coupling being of the type above identified and also "piloted" to avoid radial displacement of coupling halves.

In each of the several modifications of the transmission, the pitch diameters of the pinion are equal and the pitch diameters of the driven gears are also equal. Therefore, if sources of power of equal size are used, each of the two driven shafts will take an equal share of the loads imposed on such two output shafts regardless of the differences between such loads. All of the gearing is equally loaded and there will be no disturbance due to bending of the cable drum supporting shafts. Some of the gearing floats to aid in equalization of loads thereon, while at least one of the gears in each of the modifications is locked against axial movement. The axial and apex "runout" of the helices does not disturb equalizing of loading of the gear.

Although but a few embodiments of the present invention have been illustrated and described, it will be apparent to those skilled in the art that various changes and modifications may be made therein without departing from the spirit of the invention or from the scope of the appended claims.

We claim:

1. A power transmission comprising a casing, two power input shafts rotatably mounted in the casing in transverse spaced relation to each other and severally free to move axially, double helical pinions severally fixed to the input shafts, two power output shafts rotatably mounted in the casing in transverse relation from the pinions and from each other, at least one of the output shafts being held against axial movement, double helical driven gears severally fixed on the output shafts and severally in mesh with the pinions, and gear means connecting the driven gears in power transmitting relation with each other, said means including double helical gearing meshing with the driven gears and free to adjust axially relative thereto.

2. A power transmission comprising a casing, two power input shafts rotatably mounted in the casing in transverse spaced relation to each other and severally free to move axially, double helical pinions severally fixed to the input shafts, two power output shafts rotatably mounted in the casing in transverse relation from the pinions and from each other, both the output shafts being held against axial movement, driven gears severally fixed on the output shafts and severally in mesh with the pinions, and gear means connecting the driven gears in power transmitting relation with each other, said means including double helical gearing meshing with the driven gears on the axially fixed shafts and free to adjust axially relative thereto.

3. A power transmission comprising a casing, two power input shafts rotatably mounted in the casing in transverse spaced relation to each other and severally free to move axially, double helical pinions severally fixed to the input shafts, two power output shafts rotatably mounted in the casing in transverse relation from the pinions and from each other, the output shafts being held against axial movement, driven gears severally fixed on the output shafts and severally in mesh with the pinions, and a pair of gears in coaxial and torque transmitting relation and axially movable relative to each other for severally meshing with and adjusting to the driven gears and for transmitting power therebetween.

4. A power transmission comprising a casing, two power output shafts rotatably mounted in the casing and held against axial movement therein, double helical gears severally fixed on the output shafts, two power input shafts rotatably mounted in the casing between the output shafts and the ends of the casing and severally free for axial movement therein, double helical pinions severally fixed on the input shafts, and gear means connecting the gears on the output shafts, said means including a pair of double helical gears resiliently joined for torsional adjustment therebetween and severally meshing with the gears on the axially fixed output shafts, the gears of said means being severally free to adjust axially relative to the gear meshing therewith whereby the load on the output shafts is divided between the input shafts and a negative torque is transmitted between the output shafts.

References Cited in the file of this patent

UNITED STATES PATENTS

| 908,662 | Guy | Jan. 5, 1909 |
| 1,357,932 | Hodgkinson | Nov. 2, 1920 |

(Other references on following page)

UNITED STATES PATENTS

| | | |
|---|---|---|
| 1,401,260 | Iverson | Dec. 27, 1921 |
| 1,459,964 | Alquist | June 26, 1923 |
| 1,632,543 | Fletcher | June 14, 1927 |
| 2,148,564 | Kuhns | Feb. 28, 1939 |
| 2,386,367 | Taylor | Oct. 9, 1945 |

FOREIGN PATENTS

| | | |
|---|---|---|
| 104,458 | Great Britain | Mar. 8, 1917 |
| 111,329 | Great Britain | Nov. 21, 1917 |
| 117,840 | Great Britain | July 30, 1918 |
| 125,203 | Great Britain | Apr. 7, 1919 |